United States Patent
Cepollaro

(10) Patent No.: US 9,688,227 B2
(45) Date of Patent: Jun. 27, 2017

(54) VEHICLE BUMPER ASSEMBLY

(71) Applicant: FCA ITALY S.p.A., Turin (IT)

(72) Inventor: Fulvio Cepollaro, Turin (IT)

(73) Assignee: FCA Italy S.p.A., Turin (IT)

(*) Notice: Subject to any disclaimer, the term of this patent is extended or adjusted under 35 U.S.C. 154(b) by 0 days.

(21) Appl. No.: 14/933,704

(22) Filed: Nov. 5, 2015

(65) Prior Publication Data

US 2016/0129867 A1    May 12, 2016

(30) Foreign Application Priority Data

Nov. 7, 2014  (IT) .............. TO2014A0928

(51) Int. Cl.
| B60R 19/48 | (2006.01) |
| B60R 19/50 | (2006.01) |
| B60R 19/18 | (2006.01) |
| B60Q 1/04  | (2006.01) |
| B60Q 1/20  | (2006.01) |
| B60R 19/02 | (2006.01) |

(52) U.S. Cl.
CPC ............ B60R 19/50 (2013.01); B60Q 1/0491 (2013.01); B60Q 1/20 (2013.01); B60R 19/18 (2013.01); B60R 19/023 (2013.01); B60R 2019/1886 (2013.01); B60R 2019/505 (2013.01)

(58) Field of Classification Search
CPC ....... B60R 19/50; B60R 19/18; B60R 19/023; B60R 2019/1886; B60R 2019/505; B60Q 1/0491; B60Q 1/20

See application file for complete search history.

(56) References Cited

U.S. PATENT DOCUMENTS

| 4,466,646 A | 8/1984 | Delmastro et al. |
| 7,607,723 B2* | 10/2009 | Bierjon ............... B62D 25/084 296/203.02 |
| 7,690,703 B2* | 4/2010 | Maruko ................ B60R 19/52 293/102 |
| 8,608,214 B2* | 12/2013 | Wallace ................ B60R 19/50 293/105 |
| 2009/0243340 A1* | 10/2009 | Goldsberry ............ B60R 19/50 296/191 |

FOREIGN PATENT DOCUMENTS

| EP | 1400405 A1 | 3/2004 |
| EP | 1876054 A1 | 1/2008 |
| FR | 2325540 A1 | 4/1977 |

OTHER PUBLICATIONS

Italian Application TO20140928, Search Report Issued May 6, 2015 (7 pages).

* cited by examiner

Primary Examiner — Lori L Lyjak
(74) Attorney, Agent, or Firm — Eversheds Sutherland (US) LLP

(57) ABSTRACT

A vehicle bumper assembly having an outer surface and is a bumper having an opening and a lighting optical assembly engaging the opening is provided. The lighting optical assembly has a front wall, defining part of the outer surface, and a rear shell, which supports the front wall and comprises at least one connecting portion fixed to the bumper. The bumper assembly has an additional coupling element, which has an end fixed to the bumper and a supporting portion set behind the rear shell and is set astride of the rear shell. The material, shape, and dimensions of the additional coupling element are such as to render it elastically deformable in the event of impact at a relatively low speed.

6 Claims, 2 Drawing Sheets

VEHICLE BUMPER ASSEMBLY

CROSS-REFERENCE TO RELATED APPLICATIONS

This application claims priority under 35 U.S.C. 119(a) to Italian Application TO2014A000928 filed 7 Nov. 2014, the subject matter of which is expressly incorporated herein by reference in its entirety.

The present invention relates to a vehicle bumper assembly.

BACKGROUND OF THE INVENTION

As is known, with a front or rear impact at a relatively low speed against other vehicles or else against fixed obstacles, the bumper has the purpose of absorbing energy by undergoing deformation to prevent damage to other components.

In many solutions, the bumper supports optical lighting assemblies; for example, it supports a pair of fog-lights, which are provided with tabs or similar attachment elements, which are made of plastic material, rest on an inner surface of the bumper, and are fixed to the latter, for example via screws or pins.

This solution is widely used, but is far from satisfactory, in so far as it has been noted that the attachment elements of the type just described normally break during impact, in particular during types of impact that are tested in the test conditions set down by the European standard ECE R-42, in the case where the fog-lights are located in the area affected by the impact at low speed.

SUMMARY OF THE INVENTION

The aim of the present invention is to provide a vehicle bumper assembly that will enable a simple and inexpensive solution to the problem set forth above.

According to the present invention, a vehicle bumper assembly is provided, as defined in claim 1.

BRIEF DESCRIPTION OF THE DRAWINGS

For a better understanding of the present invention a preferred embodiment is now described, purely by way of non-limiting example, with reference to the attached drawings, wherein.

DETAILED DESCRIPTION OF THE INVENTION

Figure 1:
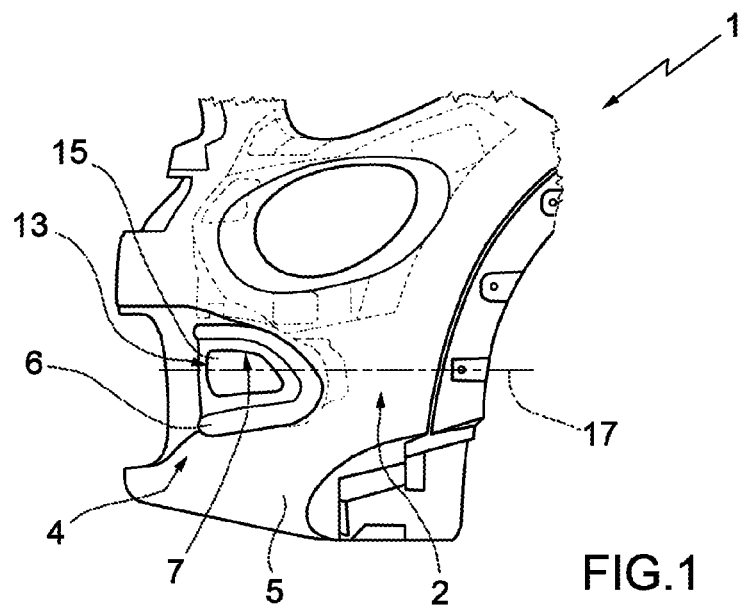
FIG. 1 is a side view of a preferred embodiment of the vehicle bumper assembly according to the present invention.

In FIG. 1, the reference number 1 designates, as a whole, a vehicle (partially represented), which comprises a bumper assembly 2. In particular, the bumper assembly 2 is set at the front end of the vehicle 1, but according to a variant not illustrated the present invention applies also to a rear bumper assembly.

The bumper assembly 2 has an inner surface 3 (FIGS. 2 and 3) and an outer surface 4, which defines part of the outer shape of the vehicle 1.

The bumper assembly 2 comprises a bumper 5, which includes one or more intermediate portions 6 that are provided with respective openings 7. Preferably, as may be seen in FIGS. 2 and 3, on the side of the surface 3 the portions 6 are shaped in such a way as to comprise respective projections 10. In particular, the projections 10 are arranged along the annular edge 11 of each opening 7 and define respective plane resting surfaces 12 (FIG. 4) provided with holes (not visible).

The bumper assembly 2 comprises, for each opening 7, a corresponding lighting optical assembly defined, in particular, by a fog-light lamp 13. Advantageously, the lamp 13 is coupled to the annular edge 11 of the opening 7 via interposition of a sealing-strip element.

The lamp 13 comprises a front wall 15 (FIG. 1), which is transparent or semitransparent, closes the opening 7 at least partially and defines a part of the surface 4.

The lamp 13 further comprises a rear shell 16, which is made of plastic material and supports the wall 15 in a way that is known and not illustrated. The shell 16 houses the optical components of the lamp 13 (not illustrated) and projects with respect to the bumper 5 inwards, i.e., in the direction opposite to the surface 4 and to the wall 15, along an axis 17 that is substantially horizontal. The shell 16 comprises a plurality of connecting portions 18 (FIG. 4) fixed, in a way known and not illustrated, to the portion 6. In particular, as may be seen in FIG. 4, the connecting portions 18 are defined by tabs and/or appendages that rest on the surfaces 12 and are fixed to the projections 10 via screws and/or pins (not illustrated).

Figure 2:
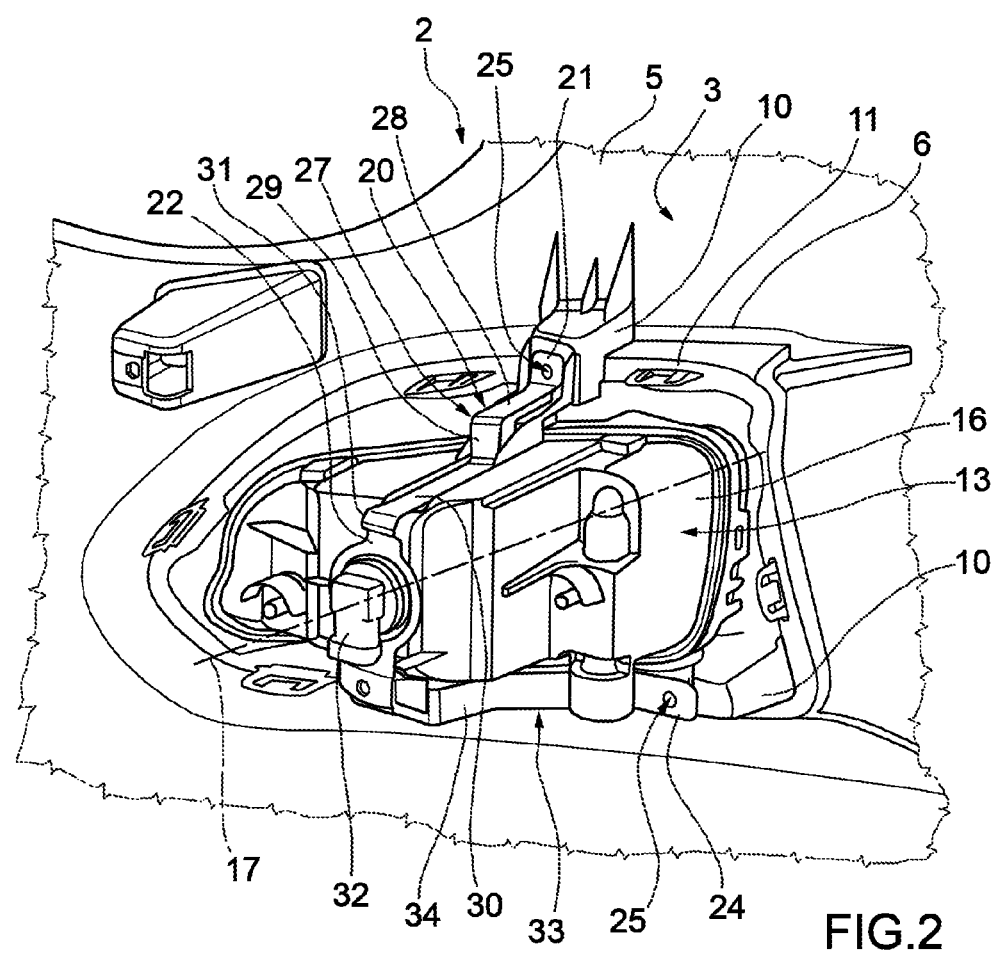
FIGS. 2 and 3 are two different perspective views that show, at an enlarged scale and from inside, a detail of the bumper assembly of FIG. 1.
Figure 3:
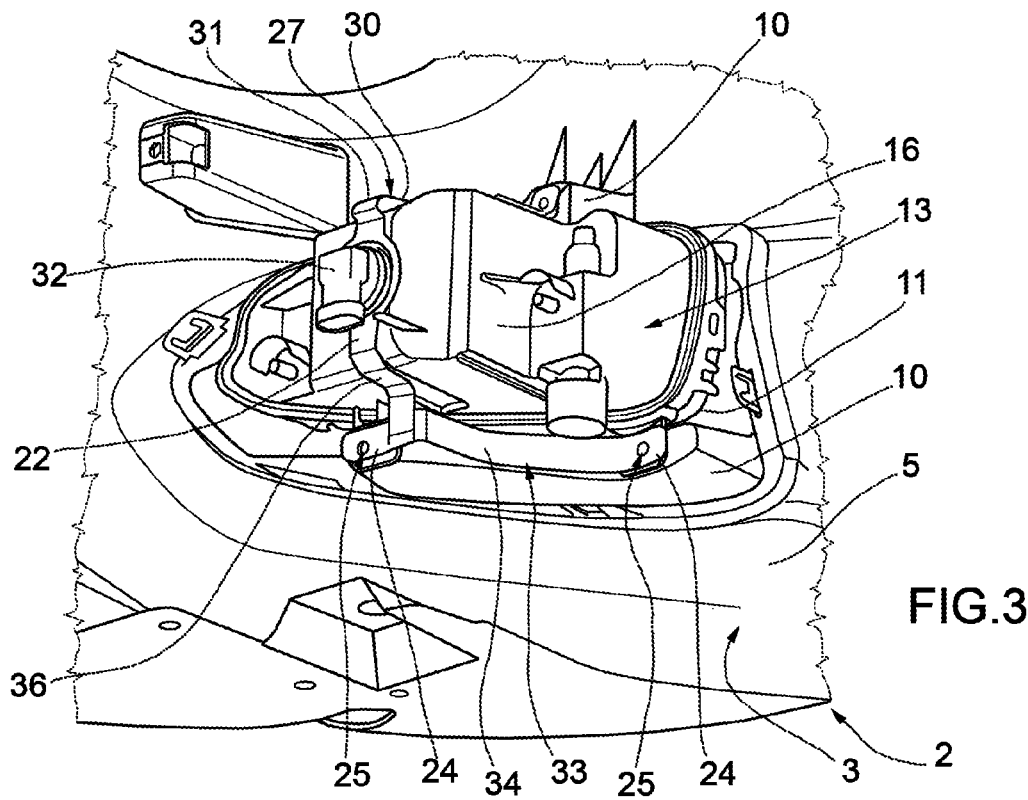
Figure 4:
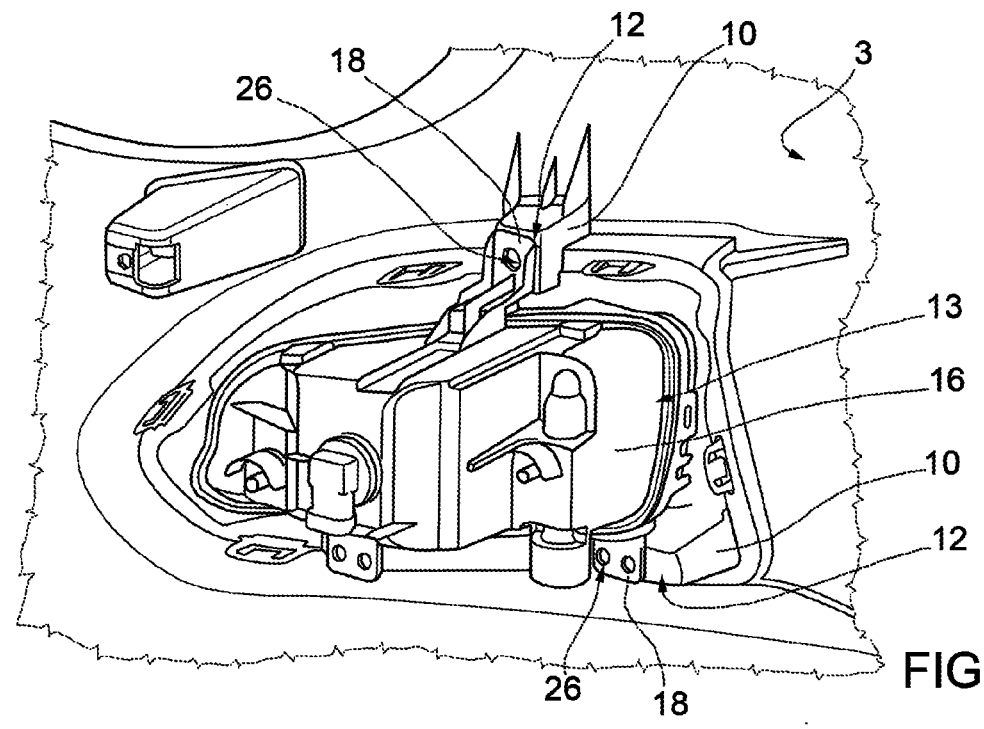
FIG. 4 is similar to FIG. 2 and shows the bumper assembly with a component removed for clarity.

With reference to FIGS. 2 and 3, according to one aspect of the present invention, for each lamp 13, the bumper assembly 2 comprises a corresponding additional coupling element 20, which in turn comprises: at least one end 21 fixed to the portion 6; and a supporting portion 22, which is set behind the shell 16 so as to be aligned with the latter and the wall 15 along the axis 17. Preferably, the portion 22 rests against the shell 16 in resting conditions, but there could possibly be envisaged a relatively small empty space between the two components.

The material, shape, and dimensions of the element 20 are established in the design stage in such a way as to allow the portion 22 to move away from the end 21 in the event of impact at a relatively low speed, in particular in the presence of conditions of impact established by the European standard ECE R-42, but without causing the elastic limit of the material in the element 20 to be exceeded in said operating conditions. In other words, the deformation of the element 20 remains in the elastic field.

The impact obviously tends to cause the lamp 13 to move back towards the inside of the bumper 5: by designing the element 20 according to the modes described above as a function of the loads and stresses that are envisaged in the case of low-speed impact, the element 20 undergoes elastic deformation and then tends to return automatically into its original configuration. In this way, the element 20 performs a function of elastic return on the shell 16 in order to bring the lamp 13 back into its original position after impact. The function of return performed by the element 20 adds to the possible elastic deformability of the connecting portions 18 and substitutes the latter in the case of damage thereto during impact.

At the same time, the stiffness of the element 20 must be such as to enable elastic deformation thereof without damage to the lamp 13.

According to the preferred embodiment illustrated, the element 20 comprises at least one end 24, which is also fixed to the portion 6 and is set at a distance from the end 21. Advantageously, the portion 22 is intermediate between the ends 21 and 24, and the latter are arranged along diametrally opposite sides of the edge 11. In this way, the element 20 is substantially C-shaped and is set straddling the shell 16.

Preferably, as may be seen in FIG. 3, the element 20 comprises two ends 24, which are arranged along one and the same side of the edge 11 and are horizontally spaced apart from one another. In particular, the end 21 is set along the upper side, and the ends 24 are set along the lower side of the edge 11, but the configuration could possibly be different (the number and position of the fixing elements of the lamp may vary with respect to what is indicated by way of example).

Preferably, but not exclusively, the ends 21, 24 are connected to the portion 6 in the same connecting points where the connecting portions 18 are connected. In this way, the solution is relatively simple in so far as it does not require dedicated connecting points on the bumper 5 and/or additional fixing elements. Moreover, the ends 21 and 24 tend to reinforce the connecting points provided for fixing the shell 16 to the portion 6. In particular, as may be inferred from FIGS. 2 and 4, the ends 21 and 24 rest on the connecting portions 18 and have respective holes 25 that are coaxial to holes 26 made in the connecting portions 18 and in the projections 10.

Once again with reference to FIGS. 2 and 3, conveniently the end 21 and the portion 22 form part of a strap or strip 27, preferably made of metal material. Thanks to the presence of a strap, the solution is relatively light and can be designed easily so as to adapt to the shape of the shell 16. The strap 27 comprises a plurality of segments or portions 28, 29, 30, which are consecutive, are transverse, and are joined to one another, and join the end 21 to the portion 22. The capacity for elastic deformation of the strap 27 is principally represented by the variation of angle in the joining areas between the portions 28, 29, 30, 22.

In the undeformed condition, the portions 28, 29, 30, 22 form with respect to one another angles such as to adapt to the shape of the shell 16, so that these angles are designed to adapt the element 20 to the optical assembly on which they are to be installed.

In particular, the strap 27 comprises an S-shaped or bellows-shaped portion 31 as element that joins the portion 30 to the portion 22, but other shapes may be envisaged to obtain the desired elastic deformability.

In particular, the portion 22 defines a ring fitted around an electrical connector 32, which projects from the shell 16. According to variants not illustrated, this characteristic is absent, in so far as the element 20 does not surround the shell 16 in the area where the lamp bulb of the lamp 13 is installed.

Conveniently, the element 20 is constituted by the strap 27 and by a strap 33, which is transverse to the strap 27, terminates with the two ends 24, and comprises an intermediate portion 34 fixed to one end 35 of the strap 27. Also the strap 33 has a structure formed by segments that are transverse with respect to one another, such as the strap 27, so as to undergo elastic deformation principally in the joining areas between said segments. Moreover, the end 35 is joined to the portion via a segment 36 (FIG. 3), which is substantially parallel and set in a position diametrically opposite to the portion 30.

On the basis of what has been explained above, it is evident that the portion 22 of the element 20 tends to withhold the shell 16, without preventing it from moving back completely, during possible impact at a relatively low speed that regards the wall 15 of the lamp 13 and tends to push the lamp 13 itself towards the inside of the bumper 5.

By undergoing deformation, the element 20 absorbs the strain and hence limits the stresses on the connecting portions 18 during impact. At the same time, the elastic action of the element 20 tends to bring the lamp 13 back into its original position, irrespective of the failure or otherwise of the connecting portions 18. It follows that the vehicle 1 can be used normally after an impact at a relatively low speed (against other vehicles or against a fixed obstacle), in so far as the orientation and functionality of the lighting assemblies has not been jeopardized by said impact.

Moreover, the particular configuration envisaged and described above for the structure of the element 20 enables a particularly simple and effective solution to be obtained.

Finally, from the foregoing it is evident that modifications and variations may be made to the bumper assembly 2 described and illustrated herein, without thereby departing from the sphere of protection of the present invention, as defined in the annexed claims.

In particular, the number and positions of the connecting points, and the shape, dimensions and material of the element could differ from what has been indicated by way of example.

The invention claimed is:

1. A vehicle bumper assembly, having an outer surface and comprising:
   a bumper provided with an opening;
   a lighting optical assembly engaging said opening and comprising:
      a) a front wall defining part of said outer surface; and
      b) a rear shell, which is coupled to said front wall and comprises at least one connecting portion fixed to said bumper; and
   an additional coupling element comprising:
      a) at least one first end fixed to said bumper; and
      b) a supporting portion, which faces said rear shell and is aligned with said rear shell and said front wall along a substantially horizontal axis;
   the material, shape, and dimensions of said additional coupling element being such as to render said additional coupling element elastically deformable so as to allow said supporting portion to move away from said first end without causing the limit of elasticity of said additional coupling element to be exceeded in the event of impact at a relatively low speed;
   wherein said additional coupling element further comprises at least one second end fixed to said bumper in a position spaced apart from said first end; said first and second ends being arranged along opposite sides of said opening so that said additional coupling element is set astride of said rear shell.

2. The bumper assembly according to claim 1, wherein said first and second ends are fixed to said bumper in the same connecting points where said connecting portion is fixed.

3. The bumper assembly according to claim 1, wherein said bumper assembly comprises two second ends arranged along the upper side or the lower side of said opening.

4. A vehicle bumper assembly, having an outer surface and comprising:
   a bumper provided with an opening;
   a lighting optical assembly engaging said opening and comprising:

a) a front wall defining part of said outer surface; and
b) a rear shell, which is coupled to said front wall and comprises at least one connecting portion fixed to said bumper; and an additional coupling element comprising:
a) at least one first end fixed to said bumper; and
b) a supporting portion, which faces said rear shell and is aligned with said rear shell and said front wall along a substantially horizontal axis;

the material, shape, and dimensions of said additional coupling element being such as to render said additional coupling element elastically deformable so as to allow said supporting portion to move away from said first end without causing the limit of elasticity of said additional coupling element to be exceeded in the event of impact at a relatively low speed;

wherein said additional coupling element further comprises at least one second end fixed to said bumper in a position spaced apart from said first end; said first and second ends being arranged along opposite sides of said opening so that said additional coupling element is set astride of said rear shell; and wherein said additional coupling element comprises at least one first strap having a plurality of segments that are transverse and joined to one another so as to undergo elastic deformation in the joining areas between said segments.

5. The bumper assembly according to claim 4, wherein said first end and said supporting portion form part of said strap.

6. The bumper assembly according to claim 4, wherein said additional coupling element is constituted by said first strap and by a second strap, which is transverse to said first strap and comprises an intermediate portion fixed to one end of said first strap.

* * * * *